(12) United States Patent
Korcz et al.

(10) Patent No.: US 9,496,698 B2
(45) Date of Patent: Nov. 15, 2016

(54) ELECTRICAL BOX HAVING SIGHT WINDOW AND MOUNTING ASSEMBLY

(71) Applicant: Hubbell Incorporated, Shelton, CT (US)

(72) Inventors: Krzysztof W. Korcz, Grainger, IN (US); Steven J. Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 280 days.

(21) Appl. No.: 13/742,098

(22) Filed: Jan. 15, 2013

(65) Prior Publication Data

US 2014/0197165 A1    Jul. 17, 2014

(51) Int. Cl.
*H02G 3/10* (2006.01)

(52) U.S. Cl.
CPC .................................... *H02G 3/10* (2013.01)

(58) Field of Classification Search
CPC .................. H02G 3/125; H02G 3/126; H02G 3/123; H02G 3/10; H02G 3/20
USPC ............. 220/3.2–3.9; 174/50–60; 248/200.1, 248/205.1, 216.1, 219.4, 228.7, 228.8, 248/230.5, 326, 342, 343; 206/459.5
See application file for complete search history.

(56) References Cited

U.S. PATENT DOCUMENTS

| 2,883,136 | A | * | 4/1959 | Smalley | H01F 27/06 248/230.5 |
|---|---|---|---|---|---|
| 3,206,579 | A | | 9/1965 | Berthel et al. | |
| 3,800,425 | A | * | 4/1974 | Haynie | G01C 9/12 116/215 |
| 4,568,804 | A | | 2/1986 | Luehring | |
| 4,758,724 | A | | 7/1988 | Osika | |
| 4,971,280 | A | * | 11/1990 | Rinderer | H02G 3/125 248/228.7 |
| 5,016,375 | A | | 5/1991 | Ngian et al. | |
| 5,902,095 | A | | 5/1999 | Cason et al. | |
| 6,104,266 | A | | 8/2000 | Tilghman et al. | |
| 6,938,881 | B2 | | 9/2005 | Grapes | |
| 2002/0179599 | A1 | * | 12/2002 | Dinh | H02G 3/20 220/3.3 |
| 2006/0237601 | A1 | * | 10/2006 | Rinderer | H02G 3/125 248/200.1 |
| 2007/0074889 | A1 | * | 4/2007 | Dinh | H02G 3/126 174/58 |
| 2012/0111596 | A1 | | 5/2012 | Mortun et al. | |

* cited by examiner

*Primary Examiner* — Fenn Mathew
*Assistant Examiner* — Cynthia Collado
(74) *Attorney, Agent, or Firm* — Dickinson Wright PLLC

(57) ABSTRACT

An electrical box and support assembly includes an electrical box and a mounting bracket. The mounting bracket has a support arm for coupling with the bottom side of the electrical box. The support arm has printed or embossed indicia identifying the load rating of the mounting bracket. The electrical box has a bottom wall with a sight window with a dimension to enable visual inspection of the indicia on the mounting bracket after installation of the electrical box to the mounting bracket.

20 Claims, 5 Drawing Sheets

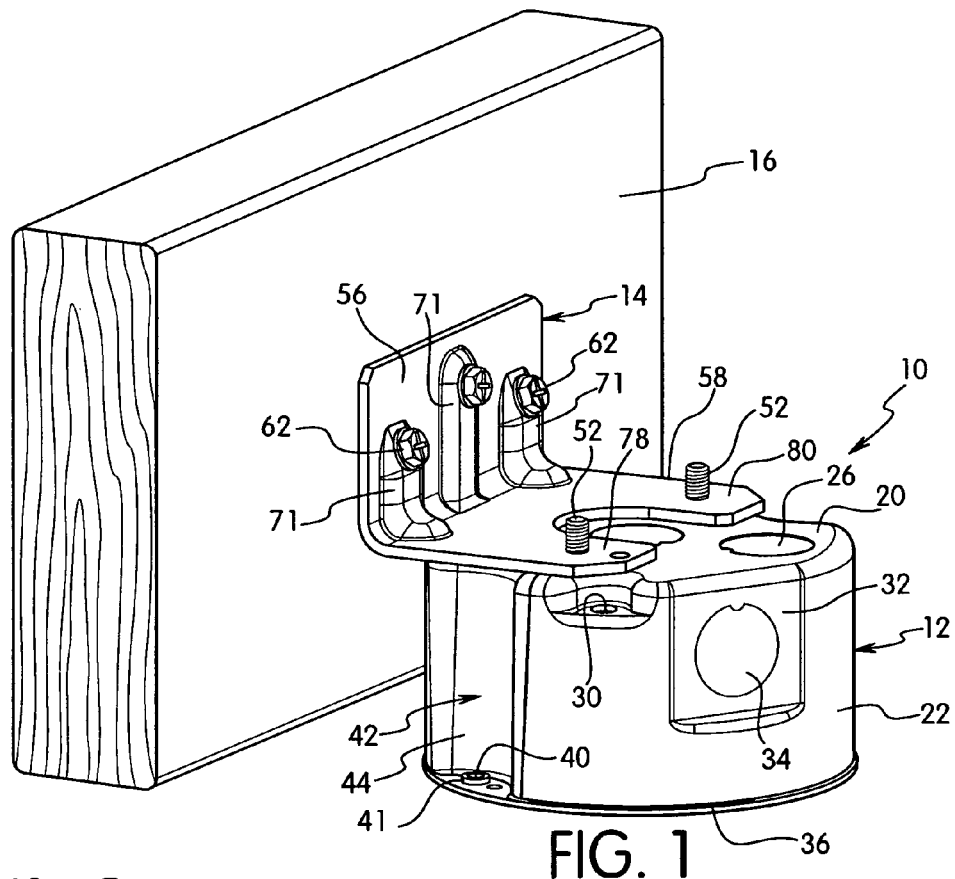
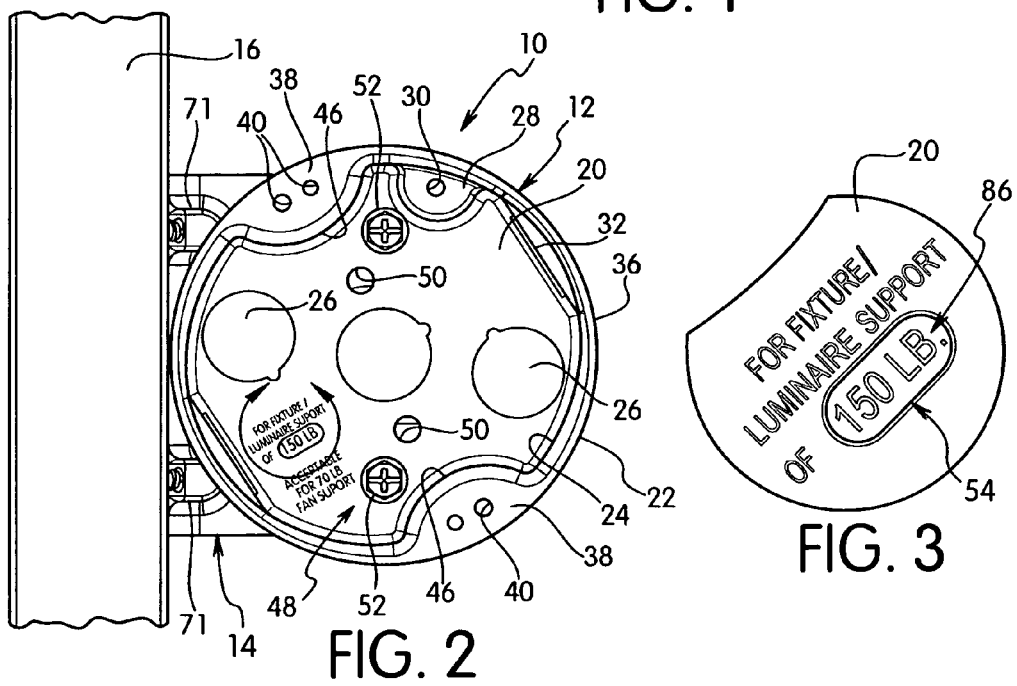

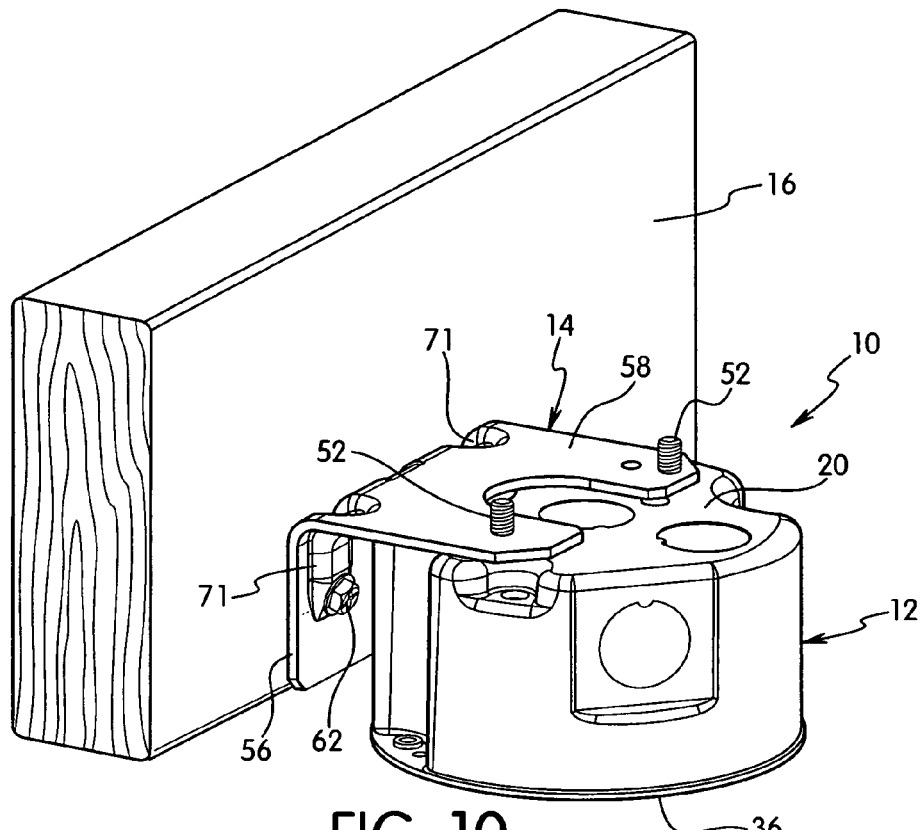
FIG. 10
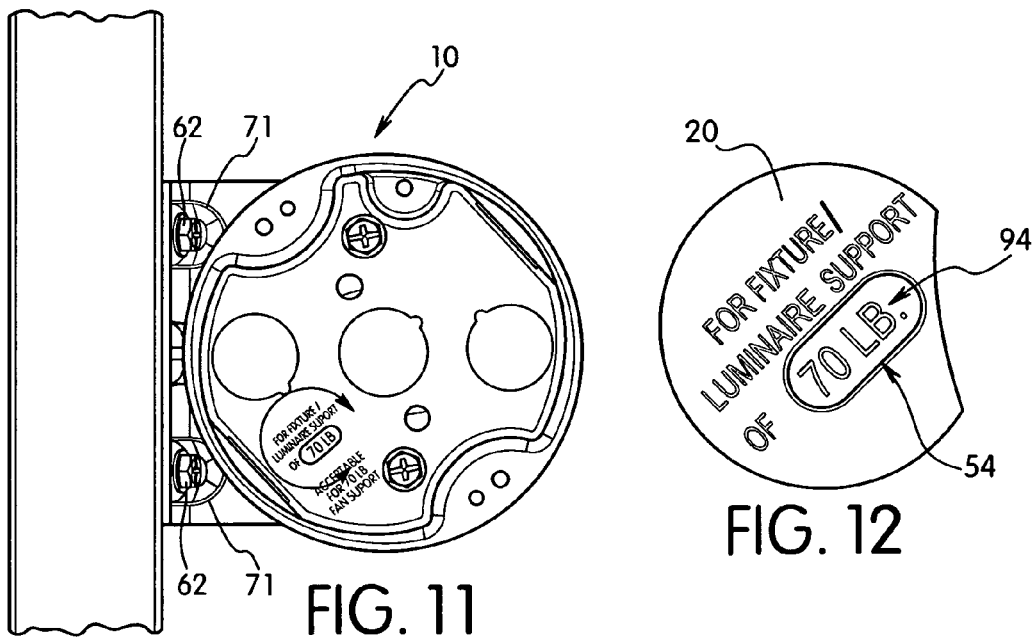
FIG. 11
FIG. 12

ELECTRICAL BOX HAVING SIGHT WINDOW AND MOUNTING ASSEMBLY

FIELD OF THE INVENTION

The present invention is directed to an electrical box assembly for mounting to a support structure. The present invention is particularly directed to a mounting bracket that can be mounted in a selected orientation and where the electrical box can be mounted to the mounting bracket with indicia on the mounting bracket being visible through an opening in the electrical box.

BACKGROUND OF THE INVENTION

Electrical boxes are typically mounted to a support structure either by directly attaching the box to the support or to a bracket that is attached to the support structure. Electrical devices, such a ceiling fan or light fixture, require an electrical box that has a suitable load rating for supporting the weight of the electrical device. Mounting brackets, the electrical box and electrical device assembly are required to have specific load bearing ratings for subsequent inspection after the electrical box is installed.

Electrical inspectors and building inspectors generally are required to verify that the proper load rating is used for the electrical box and brackets for the intended electrical device to be mounted to the electrical box. Typically the load rating on the electrical box and/or the bracket is positioned in locations that are not easily viewed during inspection. In particular, the load rating is often difficult to view or is obscured by the electrical box after installation of the box on the bracket. This results in the electrical inspector making an initial inspection of the mounting bracket after installation of the bracket and before the electrical box in installed.

Various electrical boxes and other electrical devices have been proposed with openings in certain areas. However, these devices do not allow inspection of a mounting bracket after installation. For example U.S. Pat. No. 4,568,804 to Leuhring relates to a high voltage vacuum circuit interrupter. The circuit interrupter has an indicator as shown in FIGS. 5 and 8 to provide a trip indication of the circuit interrupter. The circuit interrupter includes a sight window formed in the bottom wall of the circuit interrupter as shown in FIG. 3. The movable arm pivots to become visible through the sight window so that the indicia on the arm is visible when the circuit is tripped.

U.S. Pat. No. 4,758,724 to Osika discloses a toggle switch with a self-contained indicator device for displaying the operating condition of the switch. The switch housing includes indicator lamps with color coded lenses. A legend plate is mounted on the switch that can include interchangeable plates to indicate the switch function.

U.S. Pat. No. 5,016,375 to Ngian et al. discloses a label clip for an electrical component housing. The housing includes a base and an enclosure cap held together by a resilient wire clip. A label is fixed to the front surface of the holder and includes printed indicia identifying the electrical component.

U.S. Pat. No. 5,902,095 to Cason et al. discloses a fan speed indicator. The speed indicator is connected to a standard pull cord of a ceiling fan so that the indicator is actuated upon pulling the cord.

U.S. Pat. No. 6,104,266 to Tilghman et al. discloses a circuit breaker with a visible trip indicator. The trip indicator includes a viewing window forming part of the breaker housing. The viewing window includes indicia that is enhanced visibly when the circuit breaker has been tripped. The trip indicator has brightly colored surfaces which cause the indicia on the viewing window to be readily visible.

U.S. Patent Publication No. 2012/0111596 to Mortun et al. discloses an inlet cover and adapter assembly. As shown in FIGS. 6, 8 and 9, the assembly and the adapter include indicia to assist in the proper positioning of the components of the assembly.

While the prior devices are generally suitable for their intended purpose, there is a continuing need in the industry for improved electrical boxes and mounting assemblies.

SUMMARY OF THE INVENTION

The present invention is directed to an electrical box assembly having an electrical box and a mounting bracket. In particular, the invention is directed to an electrical box assembly where labels or other indicia on a mounting bracket are visible after installation of the electrical box for verifying the features of the mounting bracket, such as the load rating.

The electrical box assembly of the invention includes a mounting bracket that is adapted for mounting to a support structure and an electrical box that can be mounted directly to the mounting bracket. In one embodiment of the invention the mounting bracket is adapted for selectively mounting in at least two different orientations for supporting the electrical box in a desired position.

The electrical box assembly in one embodiment has a mounting bracket with a label or other identifying markings that can be visually inspected after installation of the electrical box on the mounting bracket.

The electrical box assembly in one embodiment has a mounting bracket that can be mounted in at least two different orientations where the mounting bracket has two different load ratings depending on the orientation of the mounting bracket. The orientation of the mounting bracket is selected depending on the working space and conditions and on the desired load rating for the intended electrical device.

The mounting bracket in one embodiment has a base and a support arm for supporting the electrical box. The mounting bracket is adapted for mounting in a first orientation where the mounting bracket has a first load rating for supporting an electrical device having a first predetermined weight. The mounting bracket can be mounted in a second orientation where the mounting bracket has a second load rating that is greater or less than the first load rating. The electrical box can be mounted to the mounting bracket when the mounting bracket is in either orientation and where the electrical box can be positioned in the same location regardless of the orientation of the mounting bracket.

The invention is also directed to an electrical box assembly having a mounting bracket and an electrical box where the assembly is suitable for new construction and for old work or existing construction. The mounting bracket can be mounted in different orientations depending on the construction and the required load rating of the electrical device to be mounted.

The mounting bracket in one form of the invention has a base and a support arm where the electrical box can be mounted to either side of the support arm depending on the orientation of the mounting bracket with respect to the support structure. The mounting bracket can be mounted to a support structure in a first orientation where a first side of the support arm is facing in a substantially downward or outward direction with respect to the support structure or in a second orientation where a second side of the support arm in facing in a substantially downward or outward direction. The electrical box can be mounted to the support arm in the same position or in a selected different position regardless of the orientation of the mounting bracket. In one preferred embodiment the electrical box is mounted with the open end facing outward for access to the living space.

The invention is particularly directed to a mounting bracket assembly where the mounting bracket has a predetermined rating such as a load rating and indicia on a face that is normally covered by an electrical box after the electrical box is installed. The electrical box has a sight opening oriented to correspond to the location of the indicia to enable visual inspection of the indicia after installation of the electrical box.

The various aspects and feature of the invention are attained by providing an electrical box assembly comprising an electrical box having a rear wall, a side wall and an open front side. At least one of the side walls and rear walls have a sight opening therein. A mounting bracket is adapted for coupling to a support structure and has a support arm for coupling to the electrical box. The support arm has printed indicia that is visible through the sight opening when the electrical box is coupled to the arm.

The features of the invention are also attained by providing an electrical box assembly having a rear wall, a side wall and an open front side. The rear wall has a sight window extending through the rear wall. A mounting bracket is adapted for mounting the electrical box to a support. The mounting bracket has a base for coupling to the support and a support arm extending from the base. The support arm has a first side adapted for coupling to the rear wall of the electrical box, and a second side. The first side has a first load rating indicia overlying the rear wall of the electrical box and is visible through the sight window.

The various advantages and features of the invention are further attained by providing an electrical box assembly having an electrical box with a rear wall, a side wall and an open front side. The rear wall has a sight opening extending through the rear wall and a plurality of apertures for receiving a mounting fastener. A mounting bracket is provided with a base for mounting to a support structure and a support arm for supporting the electrical box. The support arm has a first side for mounting the electrical box when the mounting bracket is in a first orientation. The first side has a first indicia visible through the sight opening. The support arm has a second side for mounting the electrical box when the mounting bracket is in a second orientation.

The various advantages and features of the invention are yet further attained by providing an electrical box kit assembly having an electrical box with a rear wall, a side wall and an open front side. The rear wall has a sight window and a plurality of apertures for receiving a mounting fastener. A first mounting bracket is adapted for mounting the electrical box to a support. The first mounting bracket has a base for coupling to the support and a support arm extending from the base. The first support arm has a first load rating and indicia corresponding to the first load rating formed in the support arm and positioned to overlie the rear wall of the electrical box. A second mounting bracket is adapted for mounting the electrical box to a support. The second mounting bracket has a base for coupling to the support and a support arm extending from the base. The second support arm has a second load rating and indicia corresponding to the first load rating formed in the support arm and positioned to overlie the rear wall of the electrical box. The electrical box is selectively coupled to either the first or second mounting bracket wherein the respective load rating on the first or second mounting bracket is visible through the sight window.

These and other objects, advantages and features of the invention will become apparent from the following detailed description of the invention, which in conjunction with the annexed drawings, disclose various embodiments of the invention.

BRIEF DESCRIPTION OF THE DRAWINGS

The following is a brief description of the drawings in which;

FIG. 1 is a perspective view of the electrical box and mounting assembly in a first embodiment of the invention showing the mounting bracket mounted in a first position;

FIG. 2 is a bottom view of the electrical box and mounting bracket assembly of FIG. 1;

FIG. 3 is an enlarged view of the sight window of FIG. 2;

FIG. 10 a perspective view of the mounting bracket and electrical box mounted in a second orientation;

FIG. 11 is a front view of the electrical box and mounting bracket of FIG. 10;

FIG. 12 is an enlarged view of the sight window and indicia of the electrical box and mounting bracket of FIG. 10.

DETAILED DESCRIPTION OF THE INVENTION

Figure 4:
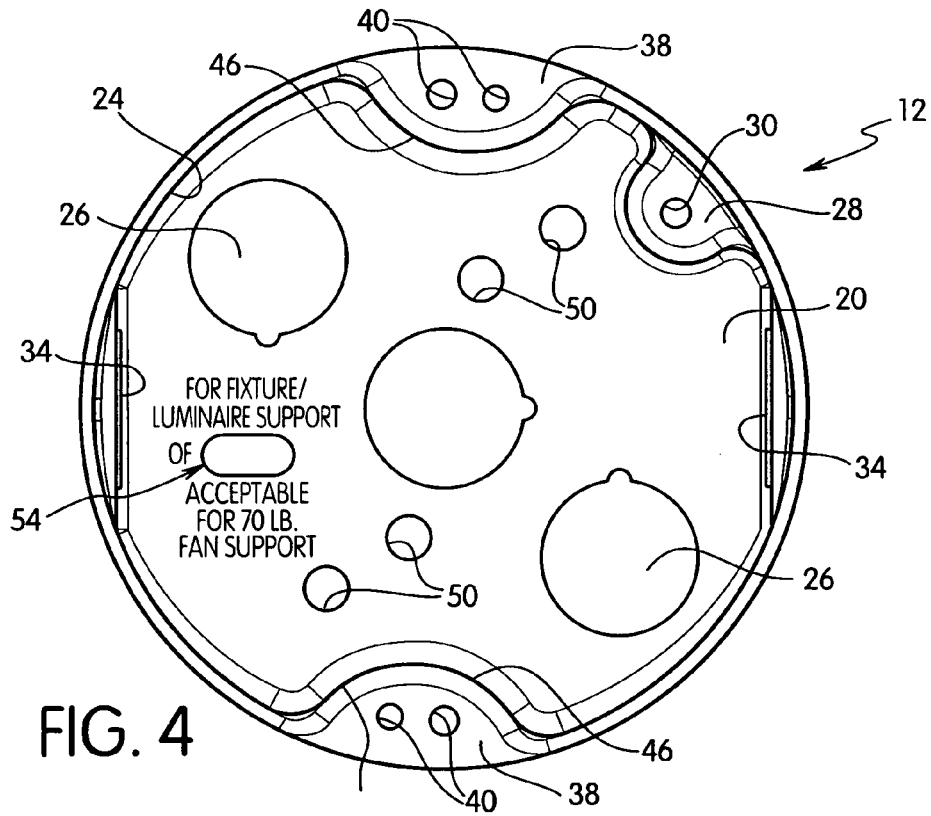
FIG. 4 a front view of the open end the electrical box of FIG. 1.
Figure 5:
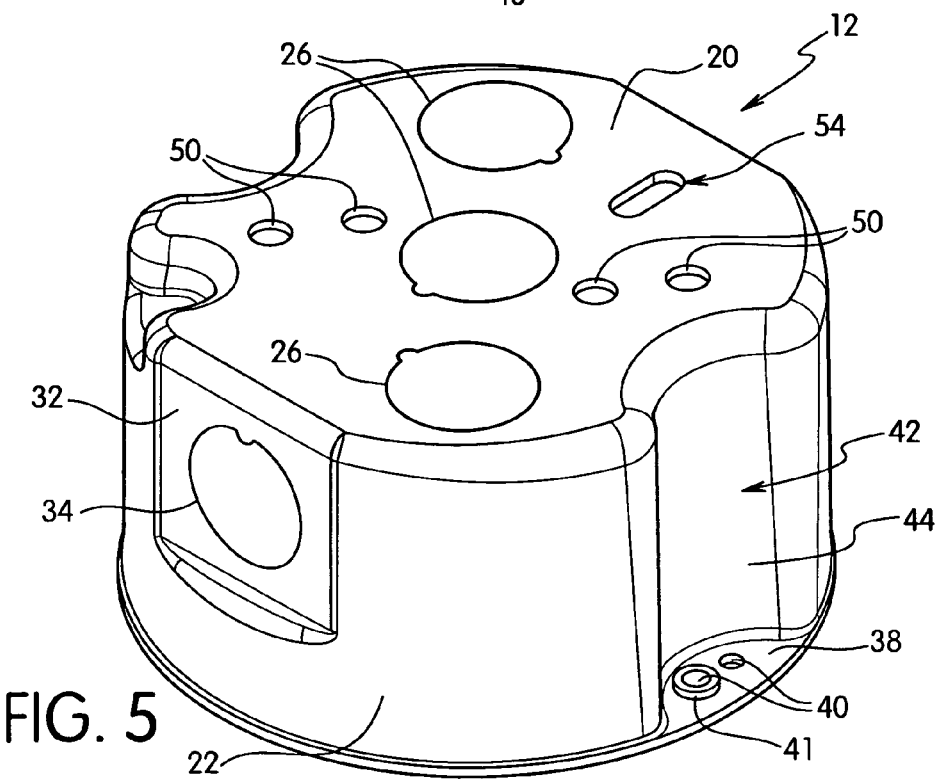
FIG. 5 is a rear perspective view of the electrical box of FIG. 4.
Figure 6:
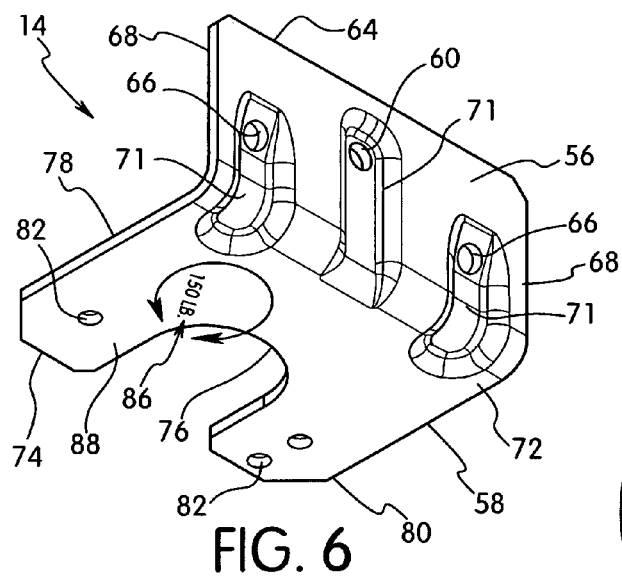
FIG. 6 a bottom perspective view of the mounting bracket in one embodiment of the invention.
Figure 7:
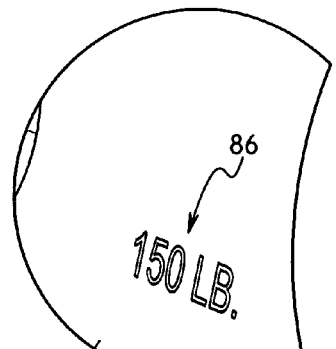
FIG. 7 is an enlarged view of the indicia on the top face of the support arm of the mounting bracket.

The invention is directed to an electrical box assembly 10 having an electrical box 12 and a mounting bracket 14. The invention is particularly directed to an electrical box assembly where the mounting bracket has a label or indicia identifying a predetermined property where the label or indicia is visible through an opening in the electrical box after installation of the electrical box to assist with ease of inspection of the label or indicia after installation of the electrical box. The invention is further directed to an electrical box assembly that enables verification of a load rating of a mounting bracket after installation of the electrical box to the mounting bracket and/or support structure.

The electrical box assembly 10 is adapted for mounting to a support structure in various orientations depending on the electrical box and the construction of the support structure. The electrical box assembly is suitable for use in new construction and old work or existing construction. The electrical box assembly is particularly suitable for mounting in a ceiling for supporting a lighting fixture or ceiling fan.

Referring to the drawings, the electrical box assembly 10 in one embodiment of the invention includes an electrical box 12 and mounting bracket 14 for mounting the electrical box to a support structure 16 as shown in FIG. 1 and FIG. 2.

Electrical box 12 can have any suitable construction or shape as needed depending on the intended use of the electrical box and the electrical device. The electrical box in the embodiment shown has a substantially round shape although square or rectangular shaped electrical boxes can be used that are compatible with the mounting bracket 14. In the embodiment shown electrical box 12 has a rear wall 20, a side wall 22 and an open front side 24. Rear wall 20 has a substantially flat, planar surface capable of contacting a flat surface and attaching to mounting bracket 14. Rear wall 20 has a plurality of knock-out or pry-out members 26 for forming openings in the rear wall 20 for receiving electrical wiring as known in the art. Rear wall 20 is formed with a raised portion 28 that is spaced from rear wall 20 toward the open front end 24 for receiving a ground screw (not shown) that is threaded through a threaded screw hole 30. The raised portion 28 extends from the rear wall 20 a distance to avoid interference of the ground screw with an opposing structure and to prevent the ground screw from extending past the rear wall 20.

Side wall 22 has a substantially circular shape in the embodiment shown with at least one flat side portion 32. The flat side portion 32 also includes a knock-out or pry-out member 34 for forming an opening to receive the electrical wiring. An outwardly extending top flange 36 at the open front side 24 of the side wall 22 includes enlarged planar portions 38 with threaded screw holes 40 for receiving mounting screws for mounting an electrical device such as a lighting fixture, ceiling fan, and the like. Preferably, the screw holes 40 are spaced-apart a distance to cooperate with the mounting screws of the electrical device. The side wall 20 is provided with a recessed area 42 below the planar portions 38 and the screw holes 40 in the top flange 36 for receiving the mounting screws for the electrical wiring device. A threaded collar 41 extends from the rear face of the flange 36 and planar portions 38 for receiving the mounting screws. The recess 42 in the side wall 22 forms a concave surface 44 on the outer face of the side wall and a convex surface 46 on the inner surface of the side wall within the cavity 48 of the electrical box 12. The concave area 44 receives the ends of the mounting screws of the electrical wiring device to separate the screws from the wiring within the cavity 48 of the electrical box 12 to prevent damage to the wiring.

Rear wall 20 of electrical box 12 also includes a plurality of apertures 50 for receiving mounting screws 52 for coupling the electrical box 12 to the mounting bracket 14. In one embodiment the two spaced-apart apertures 50 are provided where each receives a mounting screw 52. In the embodiment shown, the apertures 50 are on either side of the center knock-out 26 along a line that substantially bisects the electrical box 12. In a preferred embodiment two sets of screw mounting apertures 50 are provided in the rear wall 20 to allow selective positioning of the electrical box 12 on the mounting bracket 14 or for mounting to other support surfaces. At least two of the screw apertures are positioned to align with mounting holes in the mounting bracket 14 as discussed below.

Electrical box 12 has an open top end 24 for receiving and supporting an electrical device. In the electrical box 12 shown the top end includes the pair of threaded holes 40 for mounting the electrical device. In the embodiment shown the threaded holes 40 are positioned and spaced apart distances for supporting a lighting fixture or a ceiling fan.

As shown in FIG. 2 and FIG. 3, the rear wall 20 of the electrical box 12 has an opening forming a sight window 54 that extends through the rear wall 20. The sight window 54 in the embodiment shown has an oval shape although the sight window 54 can have other shapes and sizes. The sight window 54 has a dimension to allow viewing of mounting bracket 14 after the electrical box 12 is coupled to the mounting bracket 14.

The electrical box 12 in the embodiment illustrated is made of steel or other rigid material having sufficient strength to support the weight of the electrical device. The flange 36 and the screw holes 40 have a thickness to support the electrical device without risk of the screws pulling free from the electrical box.

The mounting bracket 14 in the embodiment shown can be mounted in different orientations depending on the intended use and the support structure 16. In one embodiment of the invention the mounting bracket has a substantially L-shape with a base 56 and a support arm 58 extending outwardly from the base 58. The base 58 has a dimension for mounting to a support structure 16 such as a ceiling joist as shown in FIG. 1. In the embodiment shown the support structure 16 is vertically oriented to allow the electrical box 12 to be oriented with the open end 24 facing in a downward direction. Alternatively, the support structure 16 can be oriented at an angle or horizontal.

The base 56 has a plurality of apertures for receiving mounting fasteners 62. In the embodiment shown, three apertures are provided to receive three mounting screws 62 or other fasteners. A central mounting aperture 60 is provided at a first distal end 64 of the base 60 and is oriented to allow the screw 62 to be driven into the support structure 16 at an angle substantially perpendicular to the plane of the support structure 16. Two outwardly positioned mounting apertures 66 are provided along the opposite side edges 68 of the base 56 and spaced toward a second proximal end 70 of the base 56 relative to the central aperture 60. The outwardly positioned apertures 66 are oriented at an inclined angle with respect to the plane of the base 56 to enable the mounting screws 62 to be driven into the support structure 16 at an incline. Preferably, the apertures 66 are angled away from the support arm 58 for ease of installation. Reinforcing ribs 71 extend in a longitudinal direction along the base 56 and extend into the support arm 58 a distance to strengthen the mounting bracket 14 and minimize flex between the base 56 and the support arm 58. Each rib 71 includes a flat surface surrounding the screw apertures 60 and 66 to angle the respective screw in the desired direction and to provide a mating surface for the screw heads.

The support arm 58 extends from the base a distance sufficient to the support the electrical box 12 and the electrical device. The support arm 58 has a first end defining a proximal end 72 coupled to the base 56. In a preferred embodiment of the invention, the base 56 and support arm 58 are integrally formed as a single one piece unit. Preferably the mounting bracket 14 is made of steel having sufficient strength to support the electrical device.

The support arm 58 has a second end defining a distal end 74 forming an outer end of the support arm 58. The distal end 74 has a recessed area 76 forming a U-shaped area to allow access to a knock-out in the electrical box 12 for wiring and/or electrical connections. The recess 76 forms a first leg 78 and a second leg 80 extending from the support arm 58 parallel to each other. In the embodiment shown at least one threaded screw hole 82 is provided on each of the legs for receiving mounting screws 52 for coupling the electrical box 12 to the mounting bracket 14. As shown, the first leg 78 has two spaced-apart threaded screw holes 82 for selectively receiving the mounting screws 52. The second leg 80 has a single threaded screw hole 82. The screw holes 82 in the each leg 78 and 80 are spaced-part a distance corresponding the spacing between the apertures 50 on the rear wall 20 of the electrical box 12.

Figure 8:
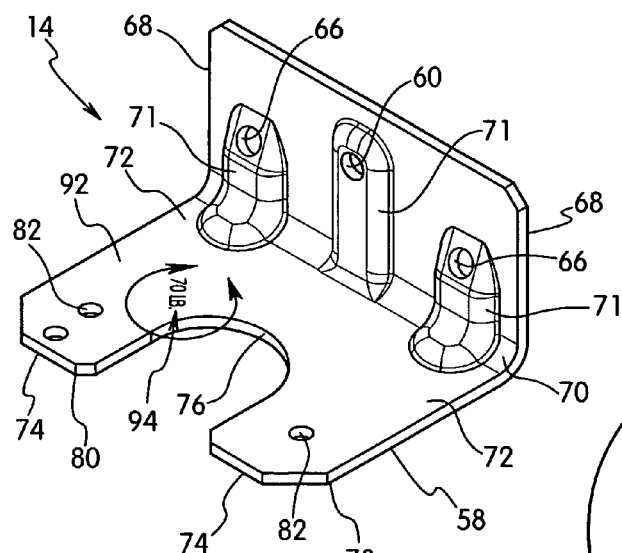
FIG. 8 is a top perspective view of the mounting bracket.
Figure 9:
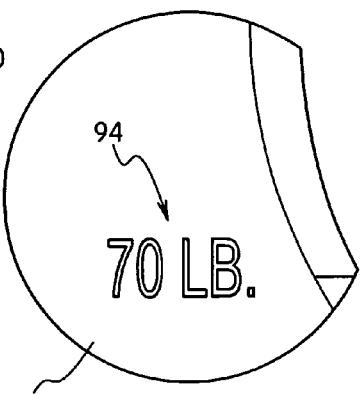
FIG. 9 is an enlarged view of the indicia on the top face of the support arm of the mounting bracket.

The mounting bracket 14 of the invention is provided with a label or indicia 86 formed in the first outer surface 88 of the support arm 58 shown in FIG. 8. The support arm 58 in one embodiment of the invention has first load rating when mounted in the position shown in FIG. 1 where the base 56 of the mounting bracket 14 extends upwardly with the open end 24 of the electrical box 12 facing in a downward direction to apply the load to the support arm 58 in the downward direction. In the embodiment shown the load rating of the mounting bracket 14 in the orientation shown in FIG. 1 is, for example, 150 lbs. The indicia 86 formed on the first downwardly facing first face 88 designate the load rating according the strength of the mounting bracket and the approved rating. The indicia 86 can be a printed label or permanently formed in the support arm 58 by embossing or stamping.

As shown in FIG. 2, the sight window 54 in the rear wall 20 of electrical box 12 is oriented to align with the indicia 86 on the support arm 58 of mounting bracket 14 to be viewed through the sight window 54 after installation of the electrical box 12 to the mounting bracket 14. In this manner the indicia 86 identifying the load rating of the mounting bracket 14 is visible through the sight window 54 to enable inspection and confirmation of the load rating by an inspector after installation without requiring separation or removal of the electrical box 12 from the mounting bracket 14. In the embodiments shown, the indicia 86 on the mounting bracket 14 and the sight window 54 are positioned to align with each other when the electrical box 12 is coupled to the support bracket 14. As shown in FIG. 2, a single sight window 54 is provided and single indicia 86 is provided on the support arm 58 of the mounting bracket 14. In alternative embodiments, each leg 78 and 80 can have indicia 86 that are positioned to align with the sight window 54 independently of the orientation of the electrical box 12 with respect to the mounting bracket 14. In preferred embodiments, the sign window 54 is completely covered by the support arm 58 to close the opening defined by the sight window.

As discussed above, mounting bracket 14 can be mounted with the base 56 of the mounting bracket 14 extending in an upward direction as shown in FIG. 1 or in a downward direction as shown in FIG. 10. Typically, the upward orientation of the mounting bracket 14 shown in FIG. 1 is used for new construction where access is available to the ceiling joist and the mounting screws. The orientation of the mounting bracket 14 shown in FIG. 10 is used for old work or existing construction for mounting an electrical device with limited access to the ceiling joist and mounting screws.

Referring to FIG. 8, a second top face 92 of the support arm 58 opposite the first face 88 also includes indicia 94 corresponding to the load rating of the mounting bracket when mounted in the position shown in FIG. 10. The load rating can be the same or different in each orientation. In the embodiment shown, the load rating is different depending on the orientation of the mounting bracket. As shown in FIG. 8, load rating identified by indicia 94 is less than the load rating identified by indicia 86 of the bottom face of the support arm 58. In the embodiment shown in FIG. 8, the load rating is 70 lbs as identified by the indicia 94. The indicia 94 positioned on the second face 92 of the support arm 58 are aligned with the sight window 54 when the electrical box 12 is mounted to the mounting bracket 14.

Figure 13:
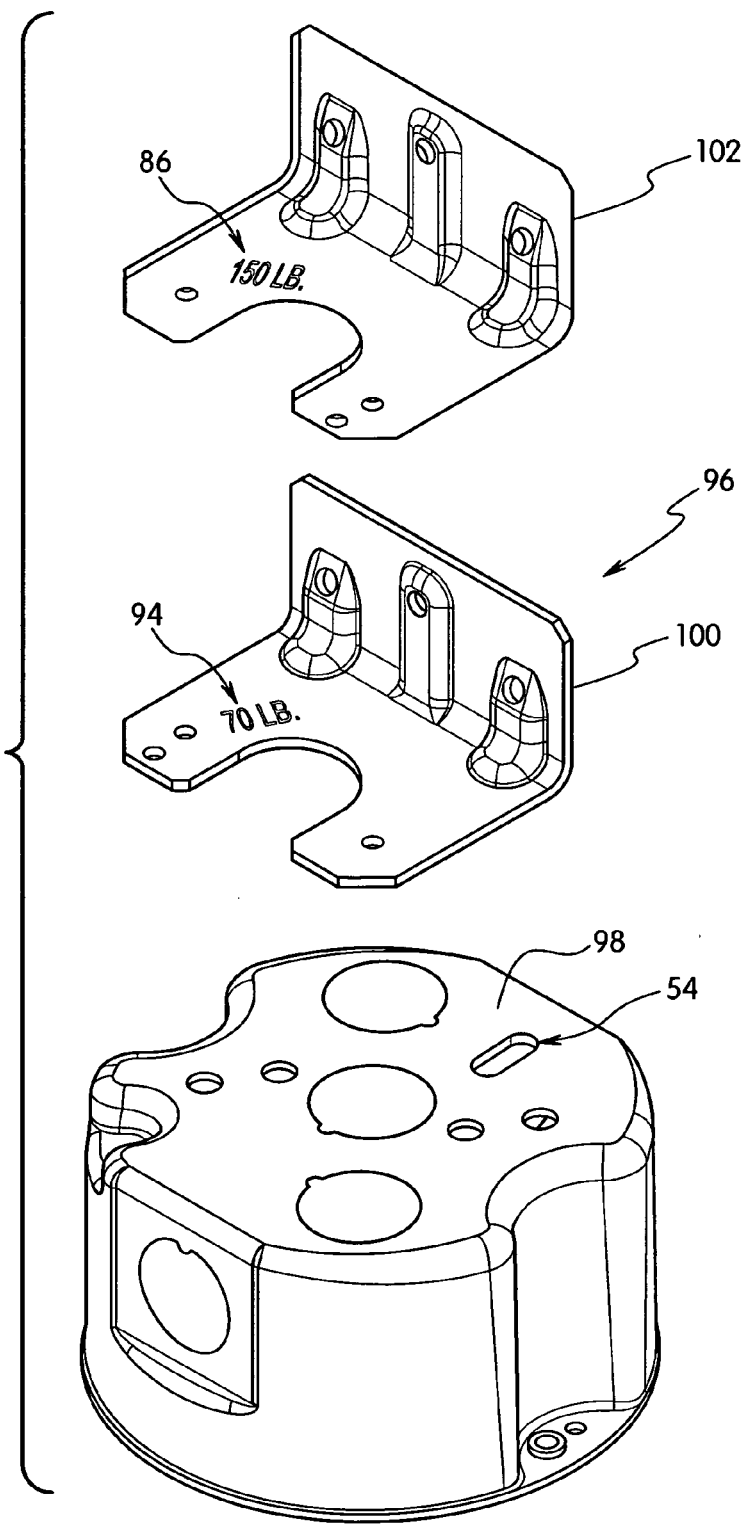
FIG. 13 is an exploded view of an assembly including an electrical box and two mounting brackets.

In a further embodiment, the electrical box assembly can be in the form of kit or assembly 96 shown in FIG. 13 having an electrical box 98 and two or more mounting brackets 100 and 102 where each mounting bracket has a predetermined load rating which can be the same or different. The mounting brackets 100 and 102 and the electrical box 98 are constructed as in the previous embodiment so further discussion is believed unnecessary. Typically, each mounting bracket has a different load rating for different installations. In one embodiment, a first mounting bracket 100 can have a load rating of about 150 lbs and a second mounting bracket 102 can have a load rating of about 75 lbs. Each mounting bracket 100 and 102 has the indicia corresponding to the load rating as in the previous embodiment where the indicia is positioned to be viewed through the sight window in the electrical box so that the indicia can be visually inspected after coupling of the electrical box to the mounting bracket and after installation of the mounting bracket and electrical box to the support structure.

While various embodiments are shown to illustrate the invention, it will be understood that various changes and modifications can be made without departing from the scope of the invention as defined in the appended claims.

What is claimed is:

1. An electrical box assembly comprising:
an electrical box having a rear wall, a side wall and an open front side, said rear wall having a sight opening therein; and
a mounting bracket adapted for coupling to a support structure and having a support arm for coupling to said electrical box, said support arm having a first face with first printed indicia identifying a first load rating of said mounting bracket that is aligned with and visible through said sight opening in said rear wall when said rear wall of said electrical box is coupled to said first face of said arm and overlying said printed indicia where said sight window surrounds at least a portion of said printed indicia, and said support arm having a second face opposite said first face for coupling to said electrical box and having second printed indicia, said second printed indicia being aligned with and visible through said sight window when said electrical box is coupled to said second face of said support arm.

2. The electrical box assembly of claim 1, wherein said rear wall of said electrical box includes a plurality of screw holes for receiving a screw to couple said electrical box to said mounting bracket, and said indicia is visible through a sight line substantially perpendicular to a plane of said rear wall.

3. The electrical box assembly of claim 1, wherein said mounting bracket has an L-shape and is adapted for mounting in a first orientation having a first load rating where said first printed indicia corresponds to said first load rating and is provided on said first face of said mounting arm, and said mounting bracket adapted for mounting in a second orientation having a second load rating that is greater than said first load rating, said second printed indicia identifying said second load rating.

4. The electrical box assembly of claim 1, wherein said mounting bracket has a base portion coupled to said support arm, said base portion having a plurality of apertures for receiving a fastener for mounting said mounting bracket to a support structure.

5. An electrical box assembly comprising:
an electrical box having a rear wall, a side wall and an open front side, and having a sight window extending through a wall of said electrical box; and a mounting bracket adapted for mounting said electrical box to a support, said mounting bracket having a base for coupling to the support and a support arm extending from said base, said support arm having a first face adapted for coupling to said electrical box, and a second face opposite said first face, said first face having a first load rating and first indicia identifying said first load rating, said indicia positioned within and surrounded by said sight window and being visible through said sight window after assembly of said electrical box to said first face of said mounting bracket and where said sight window overlies said first face and said indicia, and said second face adapted for coupling to said electrical box, said second face having second indicia, said second indicia positioned with and visible through said sight window after said electrical box is coupled to said second face of said support arm.

6. The electrical box assembly of claim 5, wherein said mounting bracket is adapted for mounting in a first orientation with said first face of said support arm facing in a substantially downward direction where said mounting bracket has a first load rating.

7. The electrical box assembly of claim 6, wherein said mounting bracket is further adapted for mounting in a second orientation with said second face of said support arm facing in a substantially downward direction and having a second load rating, said second face being adapted for coupling to said electrical box.

8. The electrical box assembly of claim 7, wherein said second indicia identifies said second load rating.

9. The electrical box assembly of claim 7, wherein said support arm has a plurality of threaded apertures adapted for receiving a mounting screw for mounting said electrical box to either said first face or said second face of said mounting arm.

10. The electrical box assembly of claim 7, wherein said mounting bracket includes a plurality of strengthening ribs extending along said base and said support arm without interfering with the coupling of the electrical box to said first face or second face of said support arm.

11. The electrical box assembly of claim 9, wherein said electrical box has a plurality of apertures for receiving said mounting screw to mount said electrical box to said support arm and to align said first indicia or said second indicia with said sight window, and where said indicia is visible through a sight line substantially perpendicular to a plane of said rear wall.

12. An electrical box assembly comprising:
an electrical box having a rear wall, a side wall and an open front side, said rear wall having a sight opening extending through said rear wall and having a plurality of apertures for receiving a mounting fastener;
a mounting bracket having a base for mounting to a support structure and a support arm for supporting said electrical box, said support arm having a first face for mounting said electrical box when said mounting bracket is in a first orientation and having a first load rating, said first face having a first indicia corresponding to said first load rating visible through said sight opening;
said support arm having a second side for mounting said electrical box when said mounting bracket is in a second orientation and having a second load rating and second indicia corresponding to said second load rating and visible through said sight opening.

13. The electrical box assembly of claim 12, wherein said mounting bracket has an L-shape and is adapted for mounting in a first orientation with said first face of said mounting arm facing in a substantially downward direction, and adapted for mounting in a second orientation with said second face of said mounting arm facing in a substantially downward direction.

14. The electrical box assembly of claim 13, wherein said mounting bracket has said first load rating when said mounting bracket is in said first orientation and said electrical box is coupled to said first face, and
said mounting bracket has said second load rating different than said first load rating when mounted in said second orientation.

15. The electrical box assembly of claim 14, wherein said support arm has a plurality of threaded screw holes for receiving mounting screws for mounting said electrical box to said first side or said second side of said support arm, said rear wall of said electrical box has a knockout for receiving an electrical wire, and said support arm has a recessed area for accessing said knockout.

16. The electrical box assembly of claim 15, wherein said mounting bracket includes a plurality of strengthening ribs extending along said base and said support arm without interfering with said electrical box when mounted to said first face and when mounted to said second face of said support arm.

17. An electrical box kit assembly comprising:
an electrical box having a rear wall, a side wall and an open front side, said rear wall having a sight window and a plurality of apertures for receiving a mounting fastener;
a first mounting bracket adapted for mounting said electrical box to a support, said first mounting bracket having a base for coupling to the support and a support arm extending from said base, said first support arm having a first load rating and indicia corresponding to said first load rating formed in said support arm and positioned to overlie said rear wall of said electrical box;
a second mounting bracket adapted for mounting said electrical box to a support, said second mounting bracket having a base for coupling to the support and a support arm extending from said base, said second support arm having a second load rating and indicia corresponding to said second load rating formed in said support arm and positioned to overlie said rear wall of said electrical box;
said electrical box being selectively coupled to either said first or second mounting bracket wherein the respective load rating on the first or second mounting bracket is visible through the sight window.

18. The electrical box of claim 1, wherein said indicia is visible through a sight line substantially parallel to a center axis of said sight window, and where said sight window has a dimension corresponding substantially to a dimension of said indicia.

19. An electrical box assembly comprising:
an electrical box having a rear wall, a side wall and an open front side, and a sight opening in at least one wall of said electrical box; and
a mounting bracket adapted for coupling to a support structure and having a base for coupling to the support and a support arm for coupling to said electrical box, said support arm having a first face with first indicia, said first face configured for coupling to said electrical box with said first indicia aligned with and visible through said sight opening in said electrical box when said electrical box is coupled to said first face of said support arm, and said support arm has a second face opposite said first face configured for coupling to said electrical box, said second face having second indicia aligned with and visible through said sight window when said electrical box is coupled to said second face of said support arm.

20. The electrical box assembly of claim 19, wherein said sight window is formed in said rear wall of said electrical box, said first indicia identifies a first load rating of said mounting bracket when said mounting bracket is mounted in a first orientation, and said second indicia identifies a second load rating different from said first load rating when said mounting bracket is mounted in a second orientation.

* * * * *